United States Patent Office 3,107,696
Patented Oct. 22, 1963

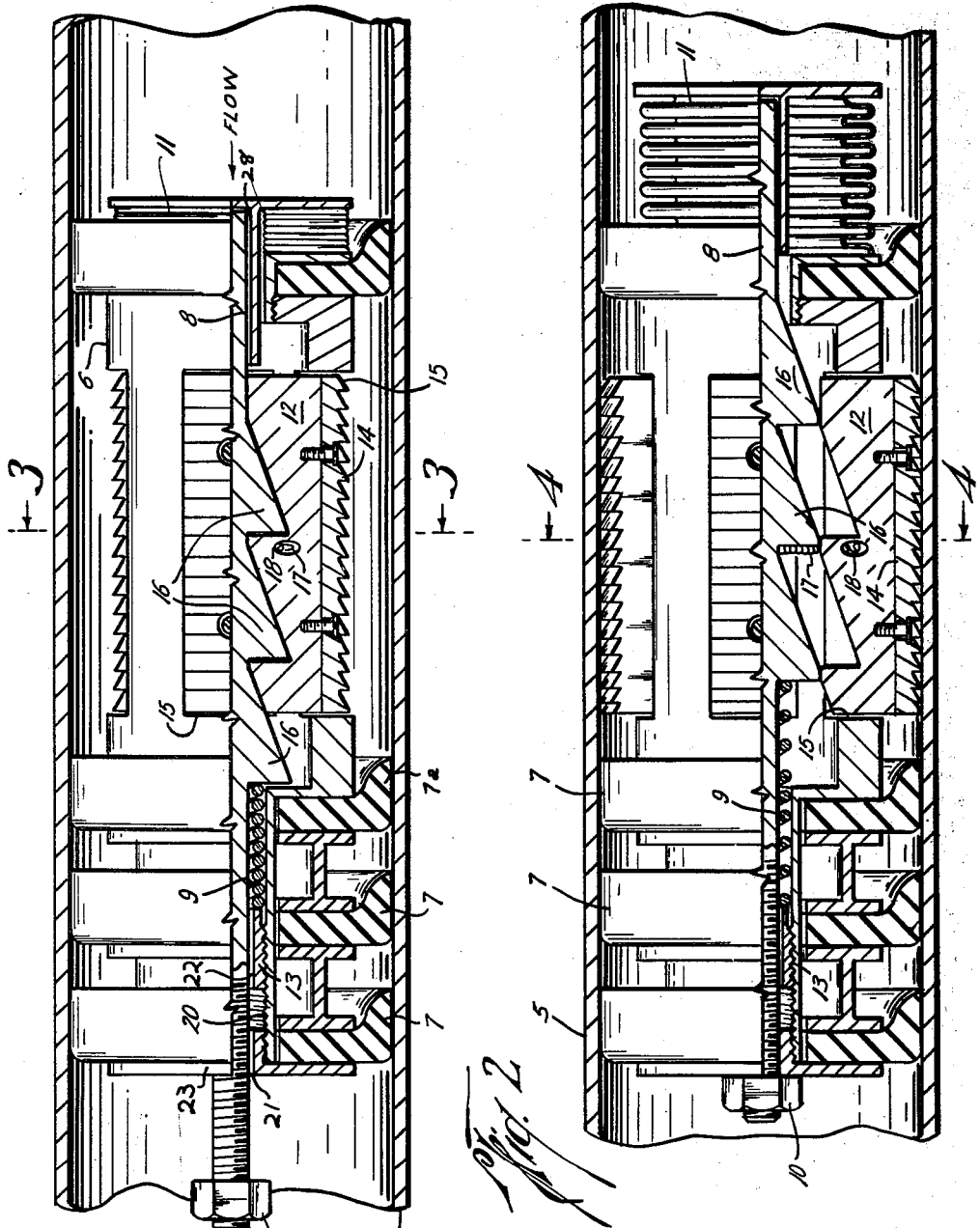

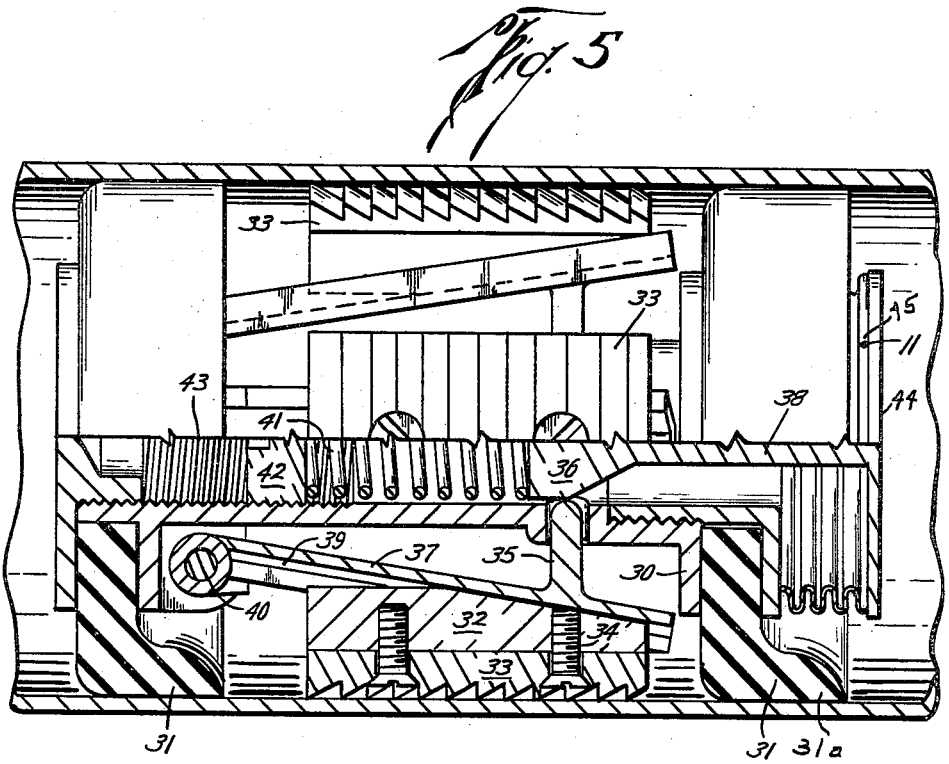
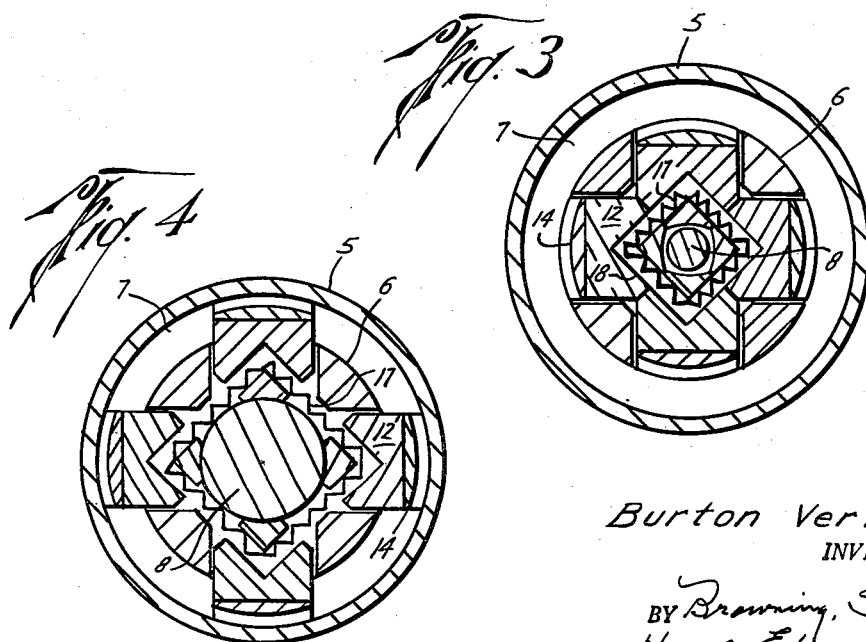
Burton Ver Nooy
INVENTOR.
ATTORNEYS

3,107,696
PLUGGING PIG
Burton Ver Nooy, Tulsa, Okla., assignor to
T. D. Williamson, Inc., Tulsa, Okla.
Filed May 2, 1960, Ser. No. 26,118
4 Claims. (Cl. 138—89)

This invention is an improved device for stopping the flow of fluid through a pipeline at any desired point.

Pipelines for oil and gas usually follow the shortest practical route from the point of introduction of fluid to the point of delivery. As a result, the pipeline frequently will traverse locations such as swamps or bottoms of rivers where it is substantially inaccessible from the surface of the ground.

When a pipeline breaks, or when replacement of a section of the pipeline is necessary, and also when repair or construction work is done which involves cutting the line, it is often necessary to close the pipeline so as to prevent loss of valuable fluids contained therein. If it is practical to do so, pipelines are closed off by operation of stationary valves, but stationary valves ordinarily are at long distances from each other along the course of a pipeline.

When it becomes necessary to close off a pipeline at locations between stationary valves, it has been customary to do so by tapping into the line and inserting a plug of valve. This type of operation is quite effective, but it requires physical access to the line, which may be completely impractical in river crossings, swamps and other difficult locations, and it is quite often desirable to plug a pipeline at such an inaccessible location.

It is customary to separate batches of fluid transmitted through a pipeline by the use of one or more devices of the free piston type. These "batching pigs" usually are merely made up of a body having a suitable number of annular sealing cups disposed around them to make sealing contact with the inner walls of the pipeline. These devices are freely movable through a pipeline and are propelled by flow of fluid.

In this invention, a pipeline packer or free piston, commonly called a "pig," is combined with a means of immobilizing the pig at any desired location by remote control. In the preferred form, the means for locking the pig in place is pressure responsive, automatically locking the pig in position upon a decrease of pressure in the pipeline and freeing the pig to resume travel in the line when normal pressure is again restored. If desired, the locking means may be made responsive to acoustic waves transmitted through the pipeline or to other impulses easily transmitted from a control station to a pig.

The locking means comprises at least two laterally movable dogs carried by the body of the pig, and having toothed outer surfaces in position to be forced against the inner wall of the pipeline by outward movement of the dogs. A remote control responsive means for moving the dogs outward against the inner wall of the pipeline is provided. This means for moving the dogs preferably comprises a spring, normally in strain, which applies force for making the dogs outward, either directly to the dogs or through any suitable transmission apparatus which may be an arrangement of cams, an inclined plane and follower, toggle links, a ratchet and gear, an eccentric wheel, or other similar device. The transmission apparatus may be actuated by a longitudinally movable shaft.

In one preferred form of the pressure actuated embodiment, a plate and bellows unit, adapted to be collapsed by pressure in the pipeline, is attached to one end of the longitudinally movable shaft. Pressure on the bellows unit acts opposite to pressure from the spring. When the pressure in the pipeline is sufficient to overcome pressure from the spring, the shaft is moved in a direction to release outward pressure on the dogs, thus releasing the pig for free travel with the fluid in the pipeline. When pipeline pressure falls below a selected value, the spring moves the control shaft to expand the bellows and to force the toothed surfaces of the dogs outward into locking engagement with the pipeline wall.

It is an object of this invention to provide a device for plugging a pipeline and stopping flow of fluid therethrough at any location desired regardless of accessibility of that location.

Another object is to provide a pipeline plugging device which can be moved through the pipeline to a selected location and then locked in place by remote control.

Another object is to provide a plugging device for a pipeline which can be moved through the line to a selected position, locked in place, and subsequently released for further travel in the line, all from a point remote from the device.

Another object of the invention is to provide a pipeline plugging device which is propelled through a pipeline by flow of fluid therein under normal pressure and which is automatically locked in place by a decrease of pressure in the line, and will be released to continue travel with fluid through the pipeline when normal fluid pressure is restored.

Still another object of the invention is to provide a plugging device for a pipeline which will be propelled through the line by flow of fluid therein and which may be locked in place or released from a remote location by the use of equipment normally used to maintain the flow of fluid through the pipeline.

A further object of this invention is to provide a pipeline plugging device propelled by flow of fluid through the line which is pressure responsive and adjustable, and can be set to be locked into place in response to a selected pressure in the pipeline.

Other objects, features, and advantages of this invention will appear from time to time as the description of the illustrative embodiment proceeds.

In the attached drawings, two preferred types of pigs are shown.

FIG. 1 is a vertical section through a pipeline and one preferred type of pig therein;

FIG. 2 is a vertical section through the device of FIG. 1 showing the dogs in position to immobilize the pig in the pipeline;

FIG. 3 is a cross section through the device of FIG. 1 on the line 3—3 showing the dogs in retracted position permitting free passage of the pig or closure through the pipeline;

FIG. 4 is a cross section of FIG. 2 on the line 4—4; and

FIG. 5 shows a device embodying a modification of this invention, partly in vertical section.

In the drawings, the reference numeral 5 designates a pipeline in which a plugging device or pig of the present invention is inserted. The pig illustrated in FIGS. 1–4 has a body member 6 and a plural number of annular sealing cups 7, carried by the body and disposed thereabout to make sealing contact with the inner wall of pipeline 5. Any number of sealing cups desired may be used providing that there are at least two, which should be spaced sufficiently far from each other to prevent loss of head at pipeline intersections, valves, etc.

The sealing cups 7 are made of resilient material such as a natural or synthetic rubber or a synthetic plastic and at least two of the cups have a sealing lip 7a around their periphery, turned back from the direction of flow of fluid in the pipeline and adapted to be pressed into sealing contact with the pipeline wall by pressure from within the cup. All cups illustrated are arranged in this manner, but it is not intended to exclude the possibility of a cup carried in reverse position to seal against backflow of fluid in case of a pipeline break behind the pig.

A longitudinally movable control shaft 8 is slidably disposed within body 6. A spring 9, normally under compression, is disposed around control shaft 8 to exert pressure on the control shaft in a direction opposite to that of flow of fluid through pipeline 5 which is illustrated as from right to left in FIGS. 1 and 2. The degree of compression placed upon spring 9 is regulated by setting an annular adjusting nut 13, which has threads upon its outer surface engaging matching threads 20 on the interior of body member 6. A means for moving the control shaft 8 forward against pressure from spring 9 in response to normal pressure of fluid flowing in the pipeline is illustrated as a plate and bellows unit 11, centrally attached to, and carried by, the rear end of control shaft 8, with its bellows sealed to the plate and to the body of the pig. Any type of bellows desired may be used. One preferred type is shaped as an annulus having a central opening therethrough which enables easy attachment of the end of control shaft 8 to the plate. This bellows may be pressurized with a suitable gas if desired; but ordinarily it is not necessary to charge the bellows with gas under pressure since adjustment of nut 13 allows the degree of pressure applied to shaft 8 by spring 9 to be controlled quite closely.

An adjustable limit nut 10 is attached to the front end of control shaft 8, preferably by threads as shown. Laterally movable dogs, comprising an inner member 12 and a replaceable toothed outer shoe 14, are disposed in openings 15 in body member 6. Any number of dogs desired may be used providing that there are at least two; but four disposed in pairs at right angles to each other, as illustrated in FIGS. 3 and 4, are preferred. Shoes 14 preferably are made of a hardened alloy steel and have their outer surfaces contacting the pipeline wall formed into a series of teeth adapted to grip the wall and immobilize the pig in the pipeline. Teeth on the faces of shoe 14, which contact the inner wall of the pipeline, may face in opposite directions to hold the packer in place against pressure of fluid exerted on either end of the packer. When teeth facing forward and backward are used, it is preferred that teeth on alternate shoes face in opposite directions, but two sets of teeth may be formed on a single shoe 14 if desired, with one set facing forward and the other set facing backward.

A means for transmitting pressure from spring 9 to move the dogs outward to contact the pipeline wall is illustrated as a series of cams 16, carried by control shaft 8, and inclined plane surfaces on the inside of members 12 adapted to serve as cam followers. A means for retracting dogs from contact with the pipeline wall when control shaft 8 is moved forward by bellows assembly 11 compressing spring 9, is illustrated as an endless spring 17 of "garter string" type disposed in openings 18 in members 12.

These openings, and the garter string spring in expanded and contracted state are shown most clearly in FIGS. 3 and 4. In FIG. 4, the spring is expanded and the dogs are in a laterally extended position contacting the pipeline wall, while in FIG. 3 the dogs are shown in their retracted position, well out of contact with the pipeline wall, in all directions.

In these figures, a preferred form of opening 18 is shown, manufactured by drilling matching V-shaped holes in all dog members 12. Other shapes for the openings containing the garter string spring might be used, but V-shaped openings are preferred because they are easy and inexpensive to manufacture.

The front end of the pig illustrated in FIGS. 1 and 3 is closed by a front plate 23 having an opening 21 therein large enough to permit easy clearance between the edges of the openings and threads on the control shaft 8. The adjusting nut 13 also is annular and has a central opening 22 through which the control shaft operates. Also, this opening is large enough that it does not make sealing contact with control shaft 8. Pressure from fluid in the pipeline ahead of the pig is thus exerted through openings 21 and 22, the hollow interior of the pig, and also upon the annulus 28 inside of the plate and bellows assembly 11 around control shaft 8. Thus, pressure in the line ahead of the pig upon this area is additive to the compressive force of spring 9 in urging the control shaft backward against line pressure from behind the pig. Adjusting nut 13 has sufficient play that the compressive force on spring 9 may be varied over wide limits. It will be seen that outward movement of the dogs may be made responsive to any desired differential in pipeline pressure between the two ends of the pig.

In routine operations, the pig assembly above described may be used as a substitute for the batching pigs which are ordinarily used to separate batches of fluid in the pipeline, and the pig of the present invention may serve both as a batching pig and as a plugging device.

The pig is inserted into a pipeline 5 at an end of the line, or at a scraper trap. To insert the pig in a scraper trap, or at an upstream end of a pipeline section, the pig is pushed into the pipe with pressure applied to compress bellows assembly 11. Compression of the bellows moves control shaft 8 forward into the position shown in FIG. 1, compressing spring 9. Pressure from the series of cams 16 on the sloping inner surfaces of members 12 of the dogs is released, and spring 17 draws the dogs out of contact with the walls of pipeline 5. Retraction of the dogs permits insertion of the packer and free movement of the packer in the line.

To insert the packer into a removable joint, or into a downstream end of a pipeline section, the limit nut 10 is tightened, thereby drawing control shaft 8 forward and moving cams 16 forward to release the dogs, and thus permit spring 17 to draw the dogs inward. The pig is then inserted in upstream direction in the pipeline, with the bellows assembly 11 inserted first. After insertion into the line in this manner, the limit nut 10 is loosened sufficiently to allow the dogs to lock in the pipeline by backward movement of the control shaft 8.

When the packer has been inserted into the pipeline, normal pressure from fluid flowing in the line collapses the sealed bellows assembly 11 and moves the control shaft 8 forward thereby compressing spring 9. Pressure from fluid flowing in the line acts on sealing cups 7 to propel the packer forward with the flow of fluid. When the pig, or group of pigs if more than one is used, arrives at a desired point, line pressure behind the pig is lowered merely by stopping operation of pumps driving the fluid through the line. Decrease in line pressure permits spring 9 to drive control shaft 8 backward, locking the pig in place by applying pressure from spring 9 through control shaft 8 and cams 16 to the dogs which are forced into locking engagement with the wall of the pipeline, thus immobilizing the pig and closing the pipeline against fluid flow. Immediate plugging of the pipeline against backflow and loss of fluid contained therein, occurs automatically in the event of a pipeline break behind the pig.

A break in the pipeline ahead of the pig will reduce back pressure on the leading end of the pig causing the pig to shoot ahead with greatly accelerated speed. Acceleration of movement of the pig reduces pressure on the plate and bellows assembly 11 from fluid in the line behind it, especially when a non-compressible fluid such as oil is being transported in the line. The dogs then move outward in response to pressure from spring 9 and lock the pig in place.

This immobilization of the pig and plugging of the line are only temporary if pumps continue to run forcing fluid into the line behind the pig. The reduced pressure will quickly return to normal, compressing bellows 11 and releasing the dogs from their locking engagement with the pipeline wall. The pig will then shoot ahead and the stop and start cycle will be repeated until the pumps can be stopped. The fluctuations in pressure occurring during the start and stop period may be used to actuate an automatic device for stopping the pumps.

The device illustrated in FIG. 5 is a modified pig having a different means for moving dogs laterally outward in response to variation in pipeline pressure. This modification comprises a body member 30 having a plurality of annular sealing cups 31 disposed thereabout to make sealing contact with the walls of pipeline 5, and having backward turned lips 31a disposed to be pressed outward against the pipeline wall by radial pressure in the pipeline. A plurality of dogs, each comprising a toothed outer shoe 33 and an inner member 32, are disposed equally distant from each other around body member 30. Each of the inner members 32 of the dogs is carried on a pair of grooved pivoted bars 37 attached to body 30 by a pivot 40.

Dog members 32 have lateral flanges slidably disposed in grooves 39 of the pivoted bars 37 and are attached to members 33 by suitable bolts 34. Bar 37 is provided with a cam follower 35 disposed to be moved outward into the locking position illustrated, by movement of cam 36 backward against direction of fluid flow. Cam 36 is carried by a control shaft 38 slidably disposed in body 30 and having its end opposite to cam 36 secured to a plate 44 of a plate and bellows assembly, designated generally as 11. This assembly includes an annular bellows assembly 45, sealed to body 30 and to plate 44. The bellows may be filled with a compressible gas under any pressure desired in a conventional manner.

A spring 41 is disposed in body 30 to bear upon cam 36 and thereby urge it backward. Spring 41 is retained in body member 30 by an adjustable nut 42 which is threaded upon its outer periphery to engage matching threads 43 on the interior of body 30.

The device illustrated in FIG. 5 operates on the same general principle as was disclosed above in the description of FIGS. 1 through 4. Normal operating pressure of fluid in a pipeline, exerted on plate 44, overcomes force from spring 41 and urges control shaft 38 forward, carrying cam 36. Under these circumstances, the cam follower 35 moves inward, thereby releasing pressure upon dogs 35 and permitting them to be drawn out of contact with the pipeline wall by a garter string spring (not shown). In this position, spring 41 being compressed, and cam 36 moved to the left, the pig is free to travel through the pipeline in response to fluid flow.

When the pig reaches any desired location, it may be immobilized and locked into place merely by stopping the pumps driving the fluid. Release of pressure upon plate 44 permits cam 36 to be moved backward, forcing cam follower 35 outward and bringing the teeth of the dogs into locking contact with the pipeline wall. Immediately after initial contact of the teeth with the interior of the wall, and forward movement of the pig in the pipeline will tend to cause flanges of members 32 to slide in groove 39 of bar 37 in an inclined plane from pivot 40 to a point above cam follower 35 and thus increases the pressure on the teeth and thereby prevents the possibility of slippage.

It will be apparent upon an examination of the written specification, the claims and the attached drawings, that many modifications may be made in the devices illustrated and described without departing from the spirit of this invention. For example, the bellows unit might be placed on the front side of the pig and, with suitable modification of the cam and follower arrangement, the pig might be made responsive to pressure in the line ahead of the pig. Many various devices may be substituted for the cam and followers shown and described. In another modification of this invention, a suitable latch may be disposed to latch the control shaft, cam or dogs into a locked position and thereby permanently lock the pig in place and close off the pipeline when a permanent closure is desired.

From the foregoing it will be seen that this invention is one well adapted to attain all of the ends and objects hereinabove set forth, together with other advantages which are obvious and which are inherent to the device.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipeline packer comprising in combination a body adapted to be inserted into a pipeline; a plurality of annular sealing cups disposed around the body to make sealing contact with the inner wall of the pipeline; a plurality of laterally movable toothed dogs carried by the body; a control shaft longitudinally movable in regard to the body centrally disposed through the body; a plate attached to an end of the control shaft; a collapsible bellows sealed between said plate and the body, said bellows being disposed to be collapsed by pressure from fluid in the pipeline to thereby urge the control shaft in one longitudinal direction; a spring disposed in the body to urge the control shaft in the opposite direction; cam means, carried by the control shaft, for urging the dogs outward into locking engagement with the pipeline wall; and a garter string spring disposed through openings in all dogs to urge all dogs inward.

2. The device of claim 1 wherein a threaded annular adjusting nut is carried by threads on the body in position to adjust loading of said spring urging the control shaft in said opposite direction.

3. The device of claim 1, wherein the cam means comprises a cam carried by the control shaft and a pivoted bar carrying the dogs and a cam follower disposed to move said pivoted bar outward in response to movement of the control shaft by said spring.

4. The device of claim 1 wherein the cam means comprises a series of cams carried by the control shaft, said cams having inclined faces, and matching inclined faces on the inner surfaces of the dogs.

References Cited in the file of this patent

UNITED STATES PATENTS

| | | |
|---|---|---|
| 1,842,116 | Rasmussen | Jan. 19, 1932 |
| 2,107,315 | Wainwright | Feb. 8, 1938 |
| 2,256,775 | Hubbell | Sept. 23, 1941 |
| 2,601,614 | Johnson | June 24, 1952 |
| 2,786,489 | Morrill | Mar. 26, 1957 |
| 2,929,410 | Morrison | Mar. 29, 1958 |
| 2,958,884 | Hill et al. | Nov. 8, 1960 |